(12) United States Patent
White

(10) Patent No.: US 7,789,409 B2
(45) Date of Patent: Sep. 7, 2010

(54) AERODYNAMIC FORK MAST STRUCTURE

(76) Inventor: Philip White, 667 Beresford Avenue, Toronto, Ontario (CA) M6S 3C4

( * ) Notice: Subject to any disclaimer, the term of this patent is extended or adjusted under 35 U.S.C. 154(b) by 345 days.

(21) Appl. No.: 11/889,205

(22) Filed: Aug. 9, 2007

(65) Prior Publication Data

US 2008/0036170 A1    Feb. 14, 2008

Related U.S. Application Data

(60) Provisional application No. 60/836,683, filed on Aug. 10, 2006.

(51) Int. Cl.
*B62K 21/02* (2006.01)
(52) U.S. Cl. ..................... 280/279; 280/281.1
(58) Field of Classification Search .............. 280/279, 280/280, 281.1, 288.3
See application file for complete search history.

(56) References Cited

U.S. PATENT DOCUMENTS

| D313,381 | S | * | 1/1991 | Moeller ............... D12/111 |
| 4,982,975 | A | * | 1/1991 | Trimble ............... 280/281.1 |
| 5,011,172 | A | * | 4/1991 | Bellanca et al. ......... 280/281.1 |
| 5,221,102 | A | * | 6/1993 | Spangler .............. 280/281.1 |
| 5,275,067 | A | * | 1/1994 | Lew ................... 74/551.1 |
| 5,404,769 | A | | 4/1995 | Kao |
| 5,415,423 | A | * | 5/1995 | Allsop et al. .......... 280/281.1 |
| 5,429,381 | A | * | 7/1995 | Mercat et al. ............ 280/279 |
| 6,017,048 | A | * | 1/2000 | Fritschen ............. 280/281.1 |
| 6,799,773 | B2 | * | 10/2004 | Kao ................... 280/281.1 |
| 7,210,694 | B2 | | 5/2007 | Trenne |
| 2006/0061057 | A1 | | 3/2006 | Trenne |
| 2007/0241531 | A1 | * | 10/2007 | D'Aluisio et al. ......... 280/279 |

FOREIGN PATENT DOCUMENTS

EP    198284 A2 * 10/1986
EP    0490120 A2   6/1992

* cited by examiner

*Primary Examiner*—Kevin Hurley
(74) *Attorney, Agent, or Firm*—Riches, McKenzie & Herbert LLP

(57) ABSTRACT

A front fork for a bicycle having an upwardly extending mast of an aerodynamic teardrop shape to which a handlebar may readily be attached.

17 Claims, 8 Drawing Sheets

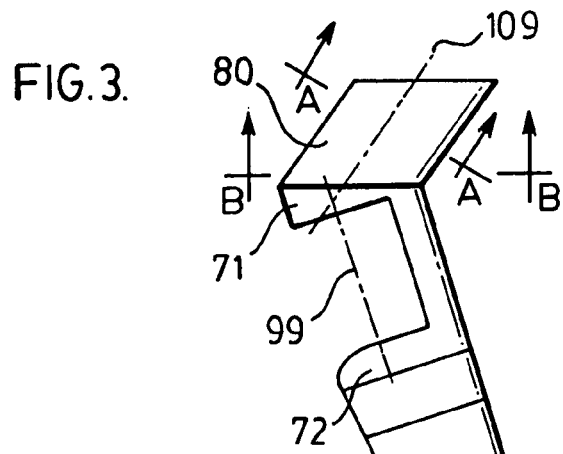
FIG.3.
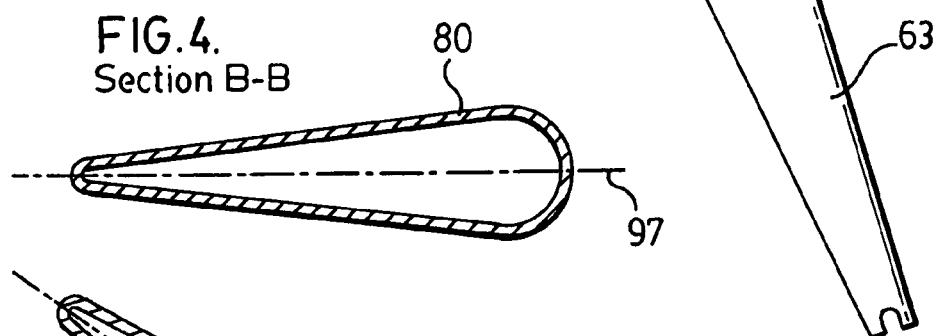
FIG.4. Section B-B
FIG.5. Section A-A
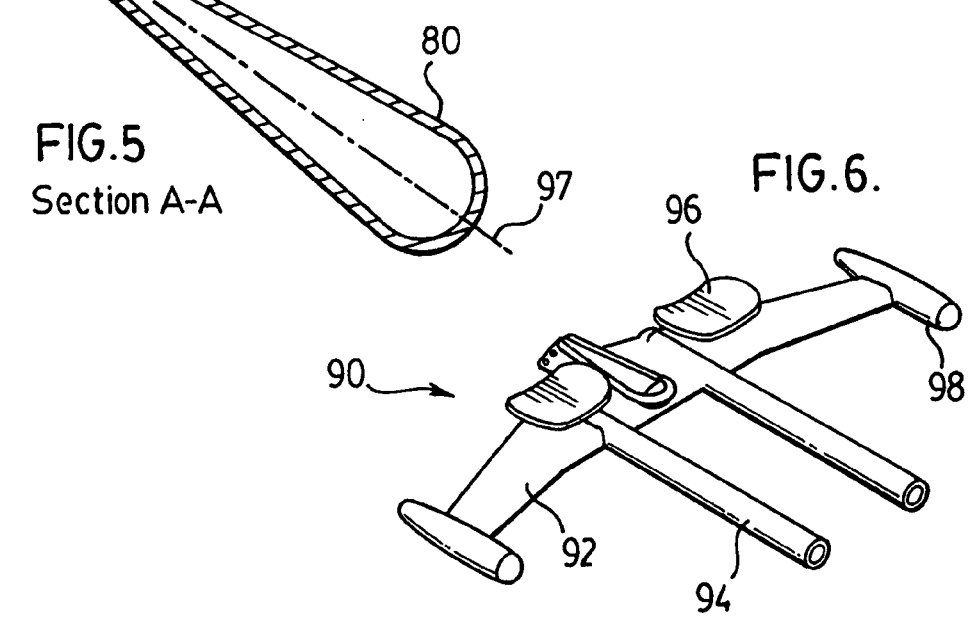
FIG.6.

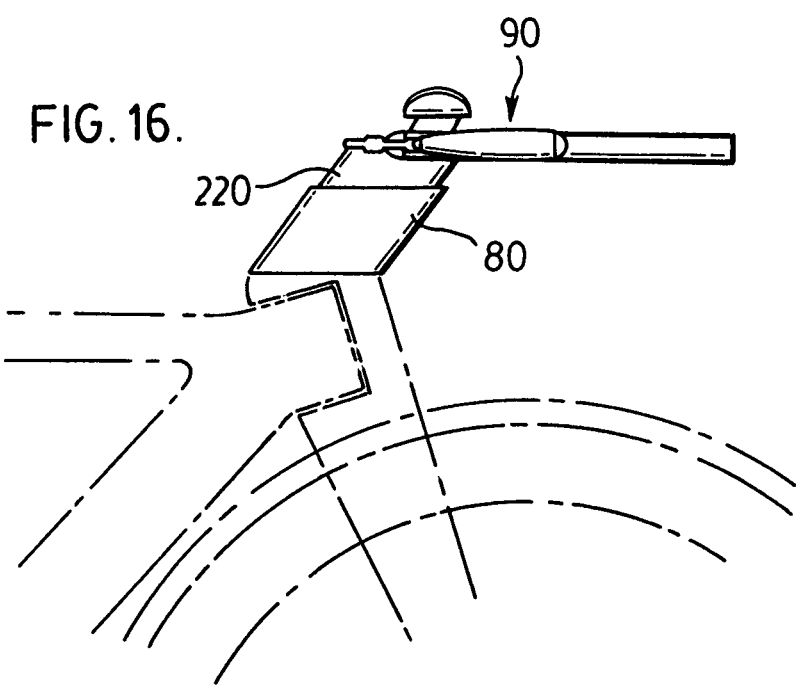
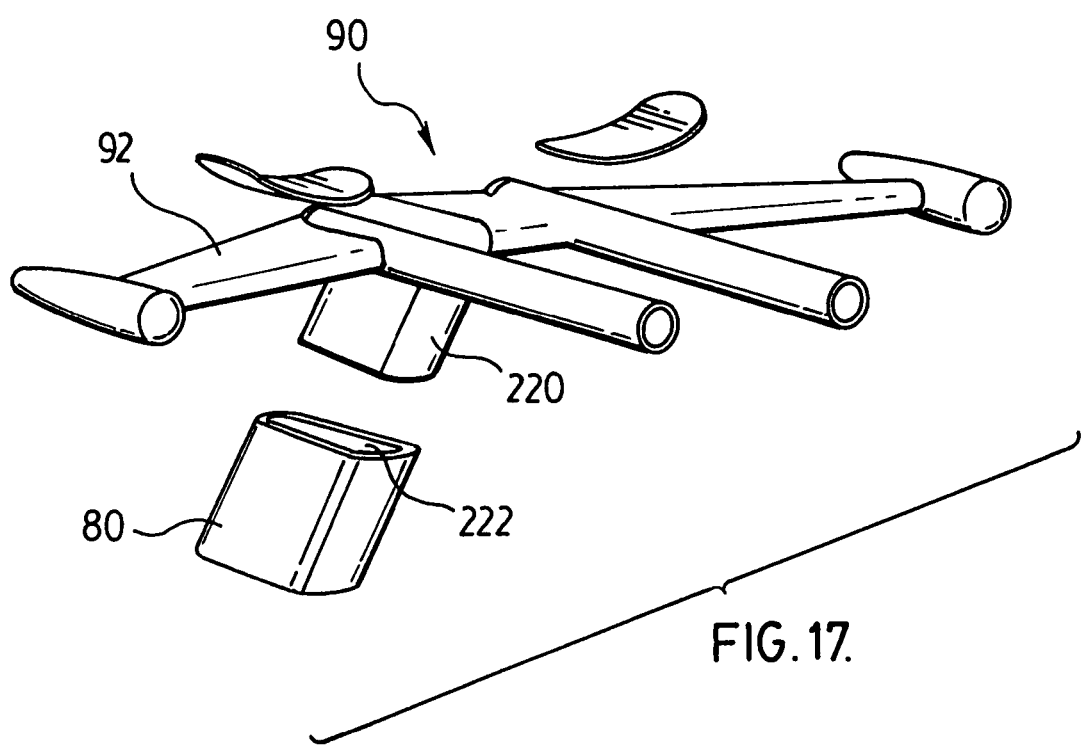

AERODYNAMIC FORK MAST STRUCTURE

RELATED APPLICATION

This application is related to and claims the benefit as under 35 U.S.C. 119 of U.S. Provisional Patent Application No. 60/836,683 filed Aug. 10, 2006

FIELD OF THE INVENTION

The present invention relates to an aerodynamic front fork mast structure for use in a bicycle.

BACKGROUND OF THE INVENTION

Known prior art fork mast structures have not been designed to reduce aerodynamic drag on the bicycle. While handlebar systems have been separately designed for aerodynamic results previously known devices have not provided a system wherein a fork mast structure, which can be connected to the handlebar system, is aerodynamic and provides handlebar adjustability, reduced weight, and improved structural integrity.

In the past, handlebar systems have been attached to fork mast structures in a variety of different ways. However, none of the previous prior art disclosures have taught a system wherein the fork mast structure is designed to have an aerodynamic shape and permits easy attachment to a handlebar system.

SUMMARY OF INVENTION

To at least partially overcome the disadvantages of the prior art the present invention provides a front fork for a bicycle having an upwardly extending mast of an aerodynamic teardrop shape to which a handlebar may readily be attached.

An object of the invention is to provide an improved aerodynamic mast for a bicycle front fork.

In the field of bicycle design and racing, aerodynamics plays an important role. Bicycles are now being designed to further reduce aerodynamic drag.

Bicycles include a main frame to which a front fork is pivotably mounted to carry a wheel at the fork's lower end and steering handlebars at the fork's upper end. The mast is a portion of the front fork which extends above the main frame to be joined with the handlebars.

In accordance with the present invention, the fork mast has an external surface that is designed to be an aerodynamic shape. In particular, the fork mast has exterior surfaces preferably of an oval shape when viewed in cross-section. Furthermore the oval shape may preferably be a teardrop shape. A teardrop shape preferably has an enlarged rounded forward end and a reduced size at the rear end. The cross-sectional shape of the fork mast is preferably substantially identical in shape and size in any cross-section through the mast to permit coupling of a handlebar to the mast.

A handlebar system is provided for mounting device to the mast.

The handlebar system may have a mounting bracket which secures the handlebar to the fork mast or a mounting plug which extends downwardly into an internal bore in the upper end of the mast. The mounting device is designed to be sufficiently robust to allow for supporting the weight of the rider, as well as directing the riders steering input to the front wheel, via the fork, in order to allow for maneuvering of the bicycle. The mounting device preferably has surfaces which slidably mate with and engage the exterior and/or interior surfaces of the fork mast, preferably with the surfaces of the mounting device disposed about a straight axis parallel to a longitudinal straight axis of the mast.

Preferably, the mating surfaces of the mounting device are shaped in a teardrop shape which is substantially the same shape and size in any cross-section as the mast. The mounting device is complimentarily shaped and sized to the mast such that the mounting bracket is slidable relative to the mast. The surfaces of the mounting device engage the exterior and/or interior surfaces of the mast to prevent the mounting device and the handlebar from rotating with respect to the fork mast.

Where the mounting device is an external mounting bracket it can be moved up and down relative to the mast and fixed to the mast at any one of a plurality of desired positions along the mast thus providing the height of the handlebar to be adjustable by sliding the mounting bracket longitudinally along the mast. Where the mounting device is an internal plug to be received within an internal mast bore at the upper end of the mast, the mast can be cut at a desired height. Preferably the mast is angled upwardly and forwardly such that the upward sliding of the mounting bracket causes the handlebar member to move forwardly and the downward sliding of the mounting bracket causes the handlebar system to move rearwardly. This adjustability allows the mast to accommodate differently sized riders.

In addition to being slidable along the fork mast, the mounting device can be removed from the fork mast and replaced with alternate mounting device if desired.

The mounting device can be attached to the fork mast structure by many arrangements including by a pinch clamp, a split clamp or wedge clamp or, for example, by bolts or other fastener.

In a preferred embodiment, the mast may be integrally formed with the remainder of the fork as a fork head of the front fork being a first half of a hinge structure which is adapted to be coupled to a complementary second half of the hinge structure on the bicycle frame.

The mast may also be a separate structure that is removably secured to the remainder of the front fork as by receiving a tubular extension of a fork head within an internal socket in the mast. This is of particular advantage when using the mast in combination with a "conventional" fork, which is affixed to the frame via a cylindrical steerer tube.

The fork mast may also be provided with a cap member located at the upper end of the fork mast. The cap member preferably has an aerodynamic shape that complements the aerodynamic shape of the fork mast.

The handlebar can be a variety of different types including a drop style handlebar or handlebars designed for time trials. The handlebar may contain many features of a conventional handlebar system, including extensions, bridge arms rests and hand grips.

In one aspect, the present invention provides a front fork member for a bicycle having a pair of fork arms, a fork head and a mast. The fork head has a lower end and an upper end and carries a journal mechanism between its lower end and its upper end. The journal mechanism complimentarily engages with a bicycle frame to allow pivoting of the fork member to the frame. This pivoting happens about a pivot axis. The fork head is symmetrical about a central plane which includes the pivot axis. Each of the fork arms is joined to the lower end of the fork head and extends downwardly to distal end. The fork arms are spaced laterally from each other about the central plane and are adapted to receive a wheel. The wheel is received between the fork arms and below the fork head. The wheel is journalled for rotation about a wheel axis which is normal to the central plane.

A mast extends upwardly and forwardly from the upper end of the fork head. The mast extends about a straight axis which is disposed in the central plane at an angle to the pivot axis. The mast is also symmetrical about the central plane. The mast has an external surface that, in any cross section normal to the mast axis, has a mast teardrop shape having an enlarged rounded forward end and a reduced size rear end. The mast teardrop shape is substantially identical in shape and size in any cross section through the mast normal to the mast axis.

In a further aspect, the top of the fork mast may be cut to a suitable height to reduce the aerodynamic drag on the mast. The mast may also be cut for adjustability of the handlebars on the mast. The handlebars may have instead of a mounting bracket, a tenon that extends downwardly from a centre portion of the handlebar. The tenon is shaped to fit into an interior bore of the mast. The tenon and bore arrangement allows the handlebar to attach to the mast. Since the top of the mast can be cut, the height of the handlebars can be adjusted to suit the rider.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 3 is a side view of the front fork as shown in FIG. 1.

FIG. 4 is a cross-section along Section B-B in FIG. 3.

FIG. 5 is a cross-section along Section A-A in FIG. 3.

FIG. 6 is a perspective view of the handlebar shown in FIG. 1.

FIG. 16 is a schematic side view similar to FIG. 3 schematically illustrating an embodiment of the mast structure where the handlebar tenon fits into the mast.

FIG. 17 is a perspective schematic exploded view of the handlebar with a tenon and the top of the mast.

DETAILED DESCRIPTION OF THE PREFERRED EMBODIMENTS

Preferred embodiments of the invention and its advantages can be understood by referring to the present drawings. Through all of the drawings the same reference numbers are used to refer to similar elements.

Figure 1:
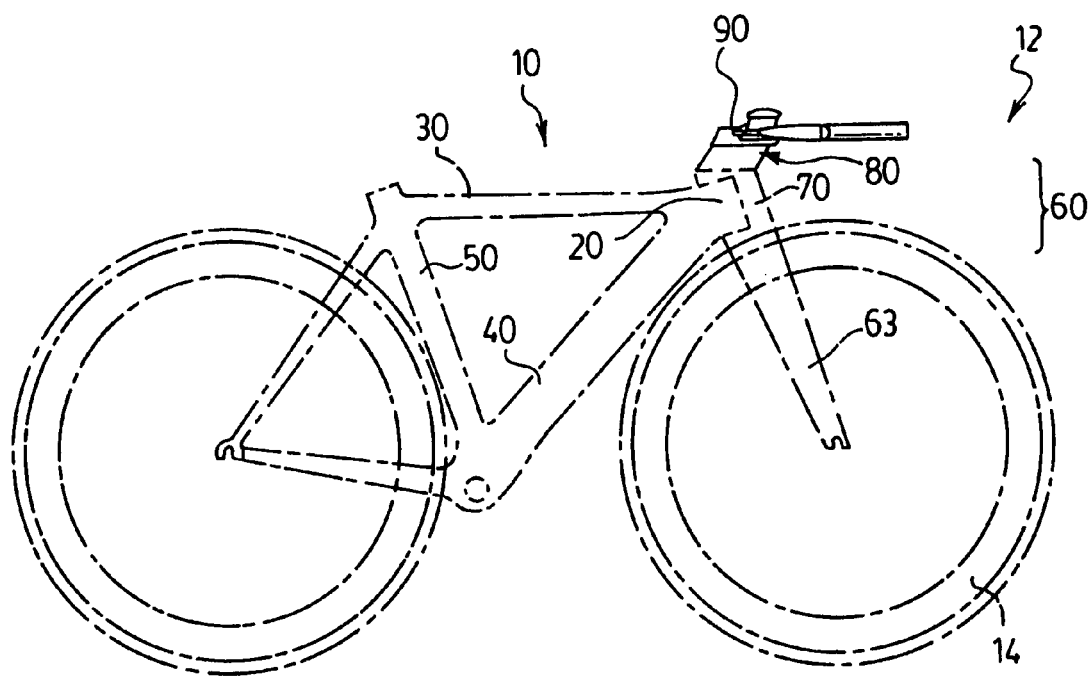
FIG. 1 is a schematic side view of a bicycle including a first embodiment of a front fork and a handlebar system in accordance with the present invention.

FIG. 1 shows a bicycle including a frame 10 having a front fork 60 with an integral mast 80 supporting the handlebars assembly 90.

The frame 10 comprising a head tube 20, a top tube 30, a down tube 40 and a seat tube 50. The bicycle, when in normal use, moves in a forward direction where the head tube 20 and down tube 40 are forward of the seat tube 50. The top tube extends generally in a forward direction. Each of the top tube 30, head tube 20, down tube 40, and seat tube 50 is a tubular member extending about their own longitudinal axis. The longitudinal axis of each of the tubular members lies in a flat longitudinal central plane running through a longitudinal axis centrally of each of the head tube 20, top tube 30, down tube 40 and seat tube 50.

The front fork 60 is pivotably mounted to the frame by a journalling mechanism 101 for pivoting about a pivot axis 99. This configuration is referred to as a "hinged fork" design.

Figure 2:
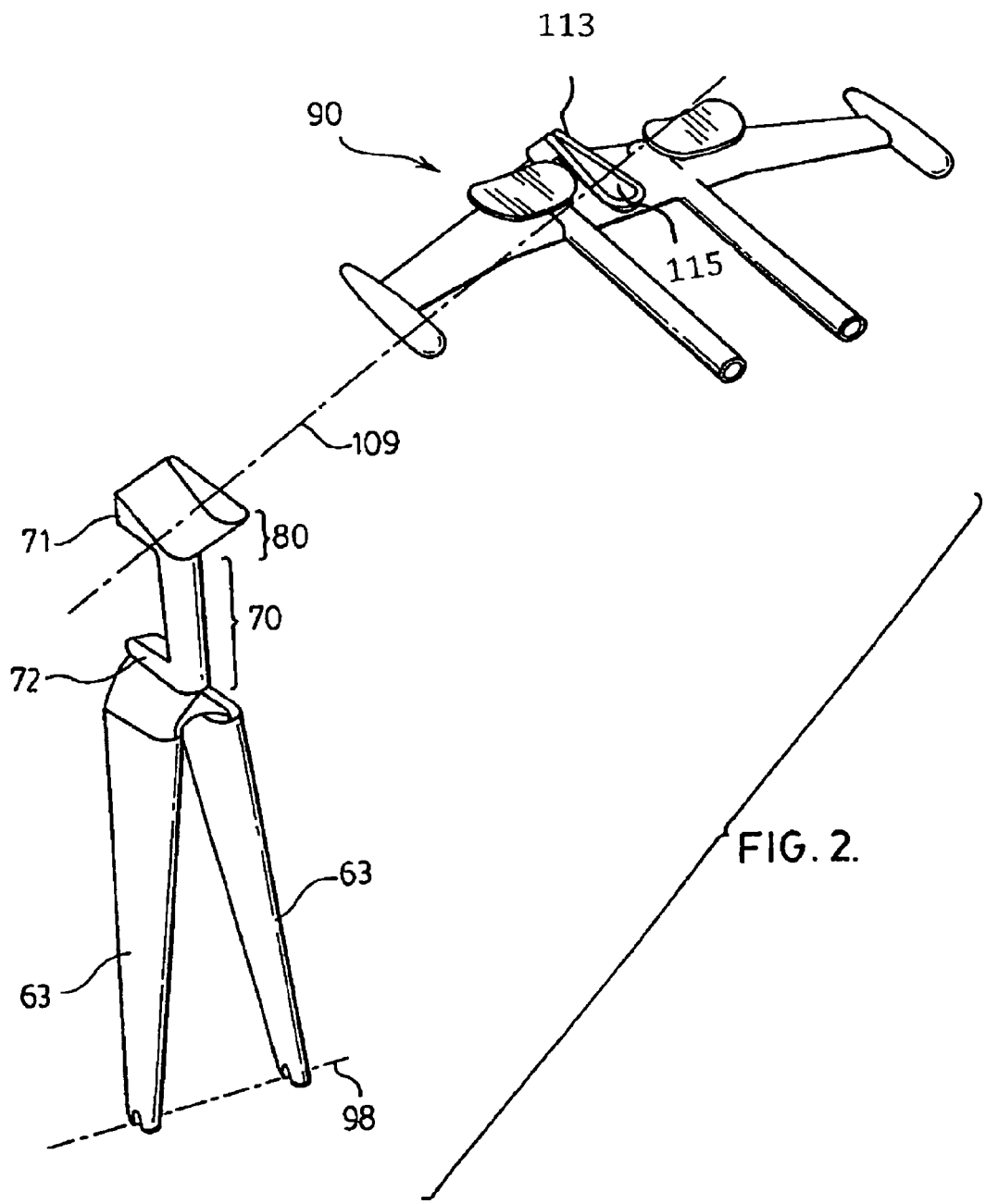
FIG. 2 is a perspective view of the front fork and mounting bracket shown in FIG. 1.

FIG. 2 shows a perspective view and FIG. 3 shows a side view of the preferred embodiment. As shown in FIG. 2, the bicycle fork 60 has a pair of fork arms 63, a fork head 70 and a mast 80. The fork head 70 has a lower end 72 and an upper end 71.

Each of the fork arms 63 extends downwardly from the lower end 72 of fork head 70 to a distal end. The fork arms 63 are spaced laterally from each other about the fork central plane 97 and are adapted to receive a front wheel 14 front fork journalled therebetween about wheel axis 98 normal the fork central plane.

Figure 7:
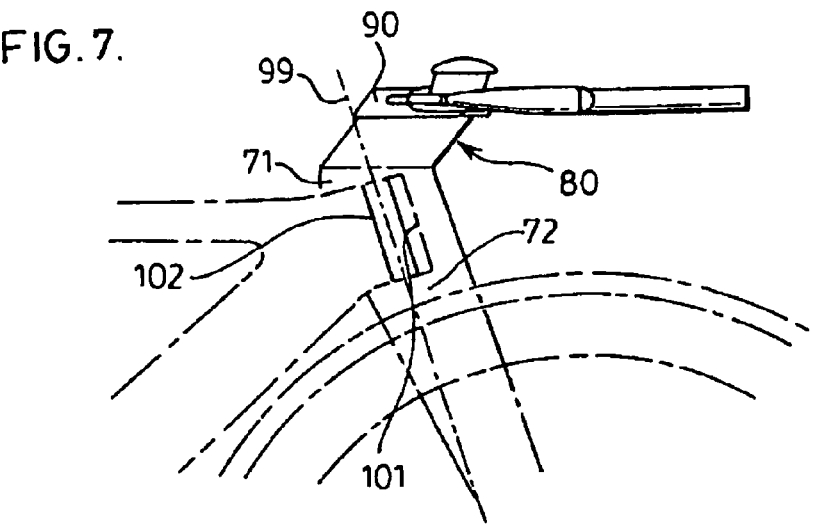
FIG. 7 is an enlarged side view of portions of FIG. 1.

The fork head 70 is journalled by the journal mechanism 101 to the bicycle frame 10. In FIG. 1 the journal mechanism 101 has a hinge-like structure. This hinge-like structure is schematically shown in FIG. 7 as having a hinge pin 102 bridging between the upper end 71 and lower end 72 of the fork head 70 and passing though an internal bore inside a front portion of the frame 10.

As seen in FIGS. 2 and 3, the mast 80 extends upwardly from the upper end 71 of the fork head 70. The mast 80 extends upwardly and forwardly about a straight mast axis 100 that is in the fork central plane at an angle to a pivot axis 99 about which the mast is symmetrical about the central plane 97.

The front fork 60 of FIGS. 2 and 3 preferably has the mast as an integral part of the remainder of the front fork which can be produced as a single piece of carbon fibre, aluminium or other suitable metals.

As shown in FIG. 3, the fork mast 80 extends in a forward direction from the upper end 71 of the fork head 70. FIG. 4 is a cross-section along Section B-B in FIG. 3. FIG. 4 shows a cross-section of the mast 80 in a horizontal plane showing the aerodynamic shape of the mast 80. Generally, this shape and size would be the same in any cross-section of the mast parallel to the horizontal. A fork central plane 97 intersects the entire fork 60 as shown in FIG. 4. The mast 80 is symmetrical about the fork plane 97. Furthermore, the fork 60 is symmetrical about a fork central plane 97 extending between the fork arms 63 and including the pivot axis 99.

FIG. 3 shows a mast axis 109 which is at a forward angle to the pivot axis 99 and extends through centre of the mast 80. FIG. 5 is a cross-section along Section A-A in FIG. 3. Mast axis 109 is normal to Section A-A. FIG. 5 shows that the mast 80 is aerodynamically shaped in the cross-section normal to the mast axis. The fork plane 97 also intersects the mast 80 in FIG. 5.

As seen in FIGS. 4 and 5, the exterior of the mast 80 is an aerodynamic teardrop shape. The mast 80 has a front end that is rounded and a rear end that is also rounded. The front end has a rounded exterior that extends further from the fork central plan 97 than the rounded end at the rear of the mast 80. The sides of the mast 80 gradually reduce in distance from the central plane 97 from the front end to the rear end creating a teardrop shape.

FIG. 2 shows a mounting bracket 113 that secures the handlebar system 90 to the mast 80. The mounting bracket has an exterior that is an aerodynamic teardrop shape. The bracket 113 also has an interior bore 115 that is sized and shaped to fit around the mast 80, and in particular is teardrop shaped to complement the teardrop shape of the mast 80.

FIG. 6 is a perspective view showing the handlebar 90 as including a base bar 92, an extension 94, an arm rest 96 and/or a hand grip 98.

FIG. 7 is an enlarged view of the fork mast of FIG. 1 which clearly shows the fork mast 80 leaning in a forward direction. FIG. 7 further includes the hinge pin 102 about the pivot axis 99 which bridges between the upper end 71 and the lower end 72 of the fork head 70. As shown in FIG. 7, the upper end 71 of the fork head 70 is the first half of a hinge structure or journaling mechanism 101. The frame 10 is the second half of the journaling mechanism 101 and is coupled to the first half of the journal mechanism.

Figure 8:
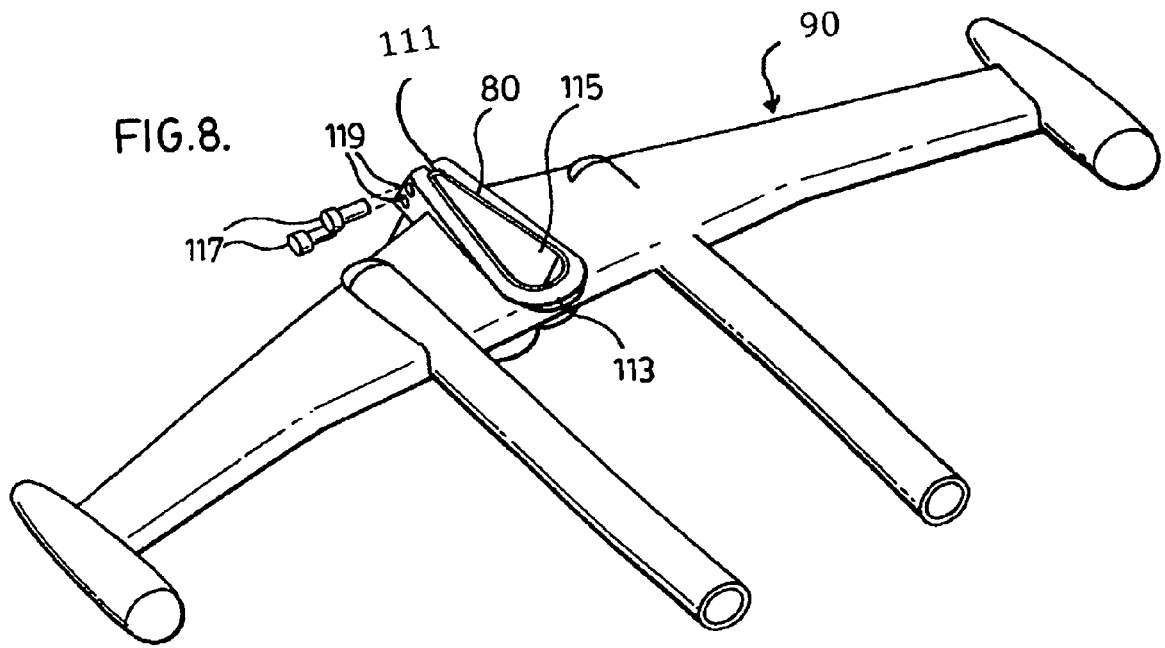
FIG. 8 is a perspective schematic view of the mounting bracket illustrating the attachment by a split clamp.

FIG. 8 shows a perspective view of the mounting bracket 113 for attachment to the mast 80. The mounting bracket 113 has a pinch clamp 111 that secures the handlebar system 90 to the fork mast 80. As shown, the mounting bracket 113 has interior bore 115 that is sized to fit around the mast 80. At the rear of the mounting bracket 113 the two sides of the mounting bracket are separated from one another. Bolts 117 are provided to fit in bracket holes 119. When the bolts 117 are tightened the two sides of the mounting bracket 113 move closer together to secure the mounting bracket to the mast 80.

Figure 9:
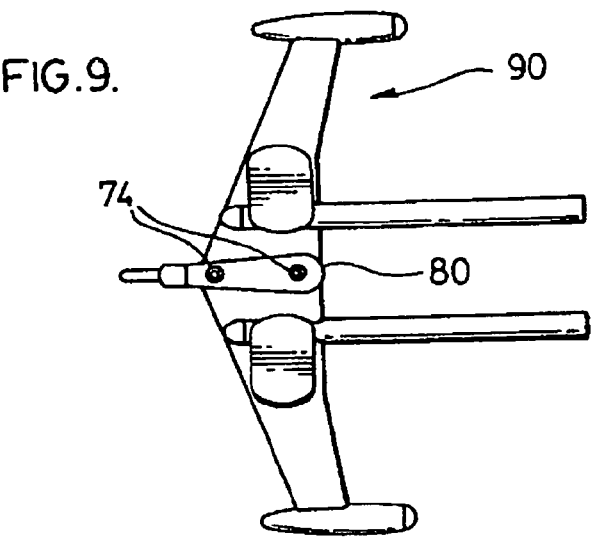
FIG. 9 is a top view of a handlebar similar to that in FIG. 1 schematically illustrating attachment by mounting bolts.

FIG. 9 is a top view of an additional embodiment of the fork mast schematically showing that the handlebar system 90 is attached by mounting bolts 74 to the top of the fork mast 80. The mounting bolts 74 can be designed with a mechanism that engages the interior of the mast to hold the handlebar system.

Figure 10:
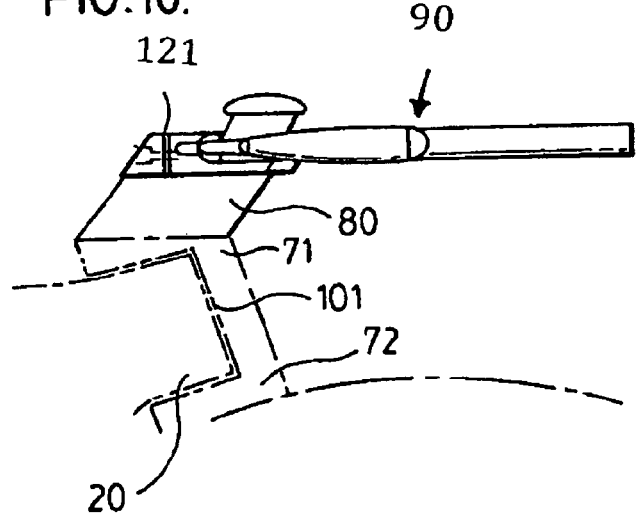
FIG. 10 is a side view similar to FIG. 3 schematically illustrating attachment of the handlebars using a split clamp arrangement.

FIG. 10 is a further embodiment of the fork mast 80 of FIG. 1. In this embodiment the handlebar system 90 is attached with a split clamp system 121. The split clamp system 121 is located in a similar position to that of the pinch clamp 111 and may be tightened around the mast by moving the two sides of the mounting bracket close to one another.

Figure 11:
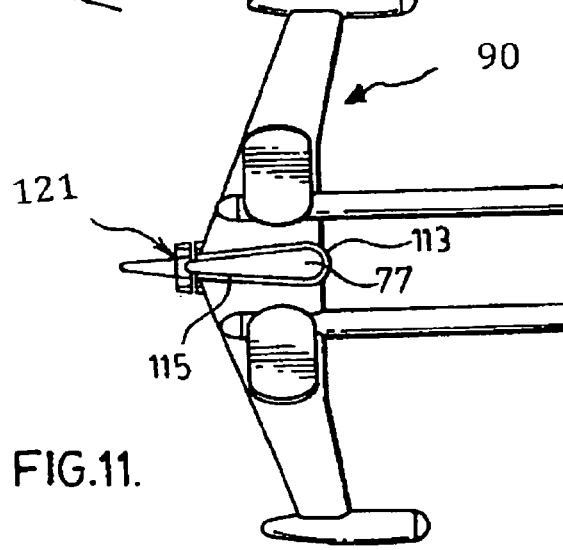
FIG. 11 is a top view of FIG. 7.

FIG. 11 is a top view of the embodiment of FIG. 7 more clearly showing the split clamp 121. A cap 77 is shown on top of the fork mast 80 above the mounting bracket with an aerodynamic shape that complements the shape of the fork mast 80. Furthermore, the cap 77 is symmetrical about the central plane 97 and has an enlarged forward end and a reduced sized rear end.

Figure 12:
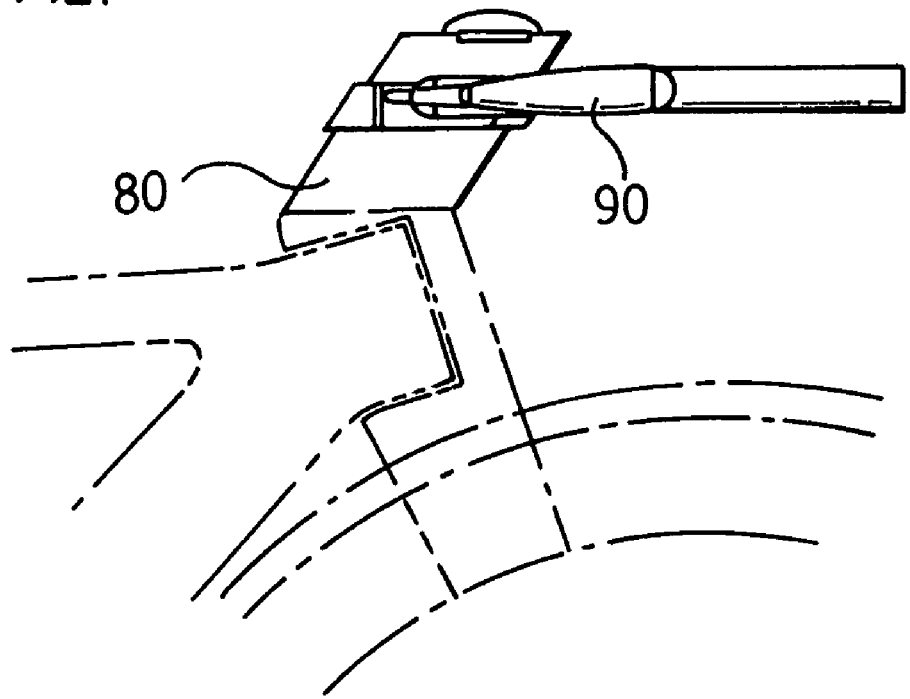
FIG. 12 is a side view similar to FIG. 3 schematically illustrating an embodiment of the mast structure where the arm rests and base bar are independently attached to the mast structure.
Figure 13:
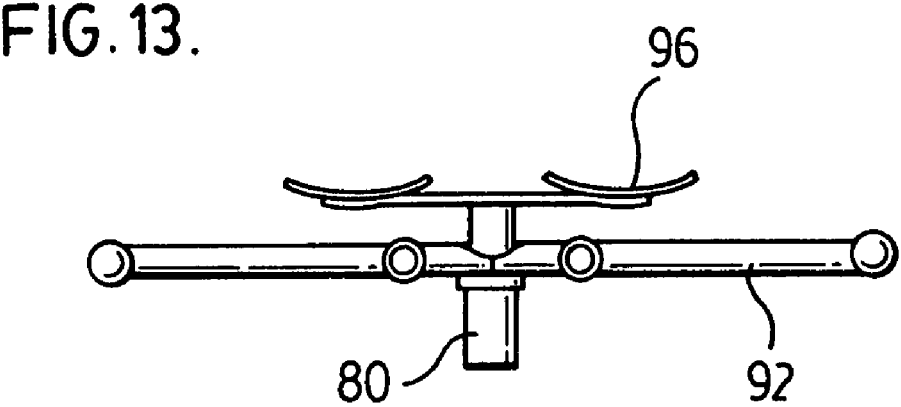
FIG. 13 is the front view of FIG. 9.

FIG. 12 is a still further embodiment of the fork mast structure 80 of FIG. 1. In this embodiment the handlebar system 90 has been attached lower than the top of the fork mast structure 80. As more clearly shown in FIG. 13, the arm rests 96 may be located at the top of the fork mast structure 80 even when the base bar 92 is located lower on the fork mast structure 80, permitting independent adjustment of the height of the base bar 92 relative to the arm rests 96.

Figure 14:
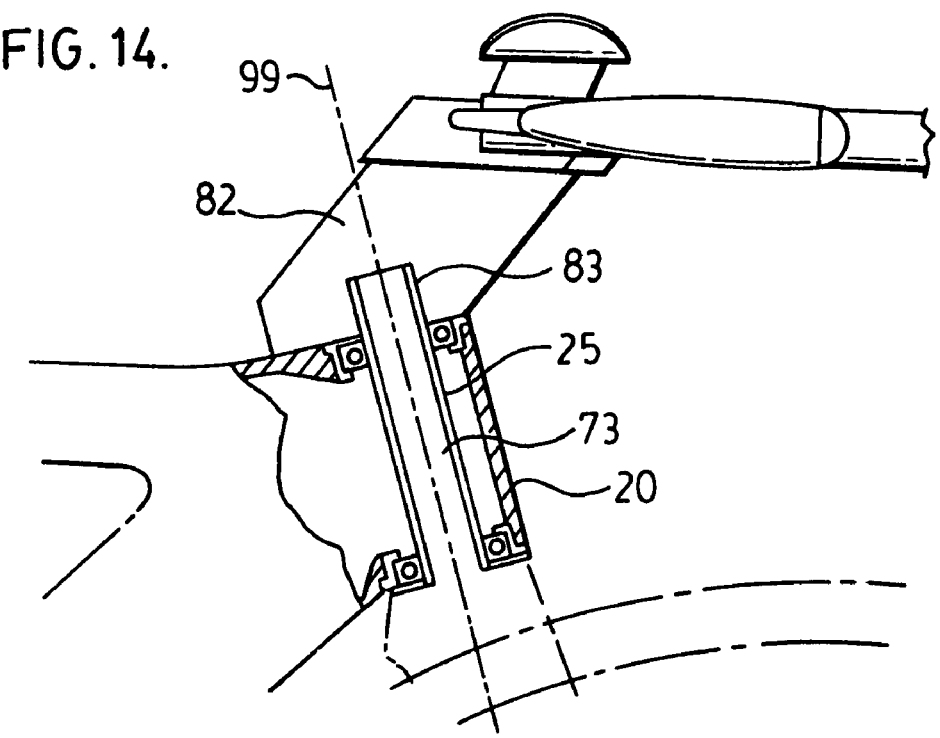
FIG. 14 is a schematic partially cross-sectional side view portion of a front end of a bicycle frame showing a second embodiment of a front fork in accordance with the present invention.

FIG. 14 is an additional embodiment of the mast 80. In this embodiment, the fork 60 has a fork head 70 with a cylindrical tubular shaped steerer tube 73. The steerer tube 73 has a central axis which is the same as the pivot axis 99. The steerer tube 73 is placed through a channel or journaling bore 25 in the top tube 20. In this embodiment the mast 80 is a separate fork mast 82. The separate fork mast 82 has the same cross-section and dimensions as the fork mast 80 as shown in FIGS. 2 to 4, but is not typically attached to the fork head 70. The top end of the steerer tube 73 fits into a socket 83 provided in the separate mast structure 82. The top end of the steerer tube 73 extends upwardly into the socket 83 and can be secured in place, to prevent movement with respect to the mast 80, by a variety of fixtures including bolts, clamps or by screwing the top end of the steerer tube 73 into the socket 83.

Figure 15:
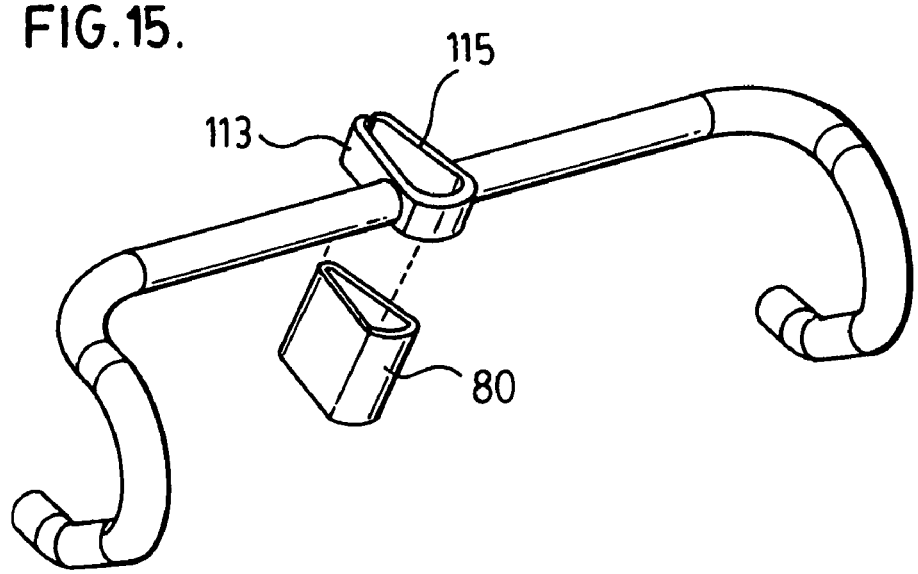
FIG. 15 is a perspective view of a mast in accordance with the invention using drop handlebars.

FIG. 15 is a perspective exploded view of the fork mast structure 80 and the mounting bracket 113. The fork mast structure 80 is a teardrop shape and so is the mounting bracket 113. The mounting bracket 113 has a bore 115 which is sized and shaped to fit around the fork mast structure. Also the exterior of the mounting bracket 113 is an aerodynamic shape, and in particular a teardrop shape.

While the journal mechanism 101 may have a hinge pin 102 bridging between the upper end 71 and the lower end 72 of the fork head 70 as shown in FIG. 7, cylindrical protrusions may replace the hinge pins 102 on the upper end 71 and the lower end 72 of the fork head 70, which index with the journal mechanism 101.

FIG. 16 is a still further embodiment of the fork mast structure 80 of FIG. 1. In this embodiment, the handlebar system 90 has a mounting plug or tenon 220 that extends downwardly from a central location of the handlebar 90. As more clearly shown in FIG. 17, the tenon 220 is shaped to slidably fit into an interior bore 222 of the mast 80. The interior bore 222 of the mast 80 in this embodiment is teardrop shaped. When the tenon 220 is slid in the interior bore 222 the handlebar system 90 is substantially attached to the mast 80. The base bar 92 can also rest on the top of the mast to hold the handlebar 90 in place. The handlebar 90 can be adjusted by cutting the top of the mast 80 to the suitable height for the rider before inserting the tenon 220 into the interior bore 222 of the mast. Alternatively, the tenon 220 may extend to rest on the bottom portion of the mast. In this embodiment the height of the handlebars can be adjusted by cutting the bottom of the tenon to a suitable height for the rider.

While the invention will be described in conjunction with the illustrated embodiments, it is understood that it is not intended to limit the invention to such embodiments. On the contrary, it is intended to cover all alternatives, modifications and equivalents as may be included within the spirit and scope of the invention as defined by the following claims.

The invention claimed is:

1. A front fork member for a bicycle having a pair of fork arms, a fork head and a mast, the fork head having a lower end and an upper end, the fork head carrying a journal mechanism between its lower end and its upper end for complementary engagement with a bicycle frame for relative pivoting of the fork member to the frame about a pivot axis, the fork head symmetrical about a central plane including the pivot axis, each fork arm joined to the lower end of the fork head and extending downwardly to a distal end, the fork arms spaced laterally from each other about the central plane and adapted to receive a wheel therebetween below the fork head journalled for rotation about an axis normal the central plane, a mast extending upwardly from the upper end of the fork head and forwardly about a straight mast axis disposed in the central plane at an angle to the pivot axis, the mast symmetrical about the central plane, the mast having an external surface having, in any cross section normal to the mast axis, a mast teardrop shape having an enlarged rounded forward end and a reduced size rear end, the mast teardrop shape being substantially identical in shape and size in any cross section through the mast normal to the mast axis.

2. A front fork member as claimed in claim 1 in combination with a handlebar member, the handle bar member having a mounting bracket for securing the handle bar member to the mast to couple the handle bar to the front fork, the mounting bracket having a bore there through with interior surfaces disposed about a straight bore axis, in any cross section normal to the bore axis the interior surfaces forming a bore teardrop shape having an enlarged rounded forward end and a reduced size rear end, the bore teardrop shape being substantially identical in shape and size in any cross section through the mounting bracket normal to the bore axis, the bore teardrop shape being complementarily shaped and sized to the mast tear drop shape such that mast is removably slidably received in the bore with engagement between the exterior surfaces and the interior surfaces maintaining the mast axis parallel to the bore axis and the mounting bracket prevented from rotation relative the mast about the mast axis, a fixation mechanism for fixedly coupling the mounting bracket to the mast at any one of a plurality of desired relative positions along the mast when the mast is received through the bore.

3. The combination claimed in claim 2 wherein the height of the handlebar member is adjustable by sliding the bracket member longitudionally along the mast with upward sliding of the handlebar moving handlebar member forwardly and rearward sliding of the handlebar moving handlebar member rearwardly.

4. The combination claimed in claim 2 wherein the mounting bracket comprises a pinch clamp.

5. The combination as claimed in claim 2 wherein the journal mechanism having an uppermost portion of the fork head comprises a journal tube member fixed to the remainder of the fork head against relative movement or rotation, the journal tube member having generally cylindrical exterior bearing surfaces disposed coaxially about the pivot axis and adapted to extend coaxially upwardly through a journaling bore on the frame for the bicycle, an upper end of the journal tube member removably fixedly secured to the mast against relative movement and rotation within an internal socket in the mast extending upwardly in the mast from a lower end thereof internally of the exterior surface of the mast.

6. The combination as claimed in claim 2 wherein as the journal mechanism an uppermost portion of the fork head comprises first half of a hinge structure adapted to be coupled to a second complementary half of a hinge structure carried by a bicycle frame.

7. The combination as claimed in claim 6 wherein the first half of the hinge structure is coupled to the second half by a hinge pin member extending coaxially of the pivot axis.

8. The combination as claimed in claim 2 wherein a cap member is removably secured to an upper end of the mast above the mounting bracket, the cap member having teardrop shape being complementarily shaped to the mast tear drop shape symmetrical about the central plane, having an enlarged rounded forward end and a reduced size rear end.

9. A front fork member as claimed in claim 1 in combination with a handlebar member, wherein:

the mast having an internal mast bore extending from an upper end of the mast into the interior of the mast, the handle bar member having a mounting plug to be received internally within the mast bore.

10. The combination as claimed in claim 9 wherein the mast bore extends parallel to the mast axis and is of a uniform shape and size in cross section normal to the mast axis.

11. The combination as claimed in claim 10 wherein the mounting plug is slidable within the mast bore parallel the mast axis for attachment and removal.

12. The combination as claimed in claim 11 wherein the mast bore and the mounting plug have complementary shapes which are asymmetrical relative the mast axis such that the mast bore engages the mounting plug against relative rotation.

13. The combination as claimed in claim 11 wherein the mast comprises a hollow tubular member.

14. The combination as claimed in claim 13 wherein the mast is adapted to be cut in a cross section normal to the mast axis to adjust the height of the upper end of the mast and thereby the height at which the handlebar member is located on the mast by insertion of the mounting plug into the mast bore.

15. The combination as claimed in claim 14 wherein the mast bore has a teardrop shape having an enlarged rounded forward end and a reduced size rear end similar to the tear drop shape of the external surface of the mast.

16. The combination as claimed in claim 9 including a fixation mechanism for fixedly coupling the mounting plug in the mast bore.

17. A front fork member as claimed in claim 1 in combination with a handlebar member, the handle bar member having a mounting device for securing the handle bar member to the mast to couple the handle bar to the front fork, the mounting device engaging exterior surfaces and/or interior surfaces of the mast to prevent relative rotation of the handlebar member relative the mast.

* * * * *